Nov. 1, 1938.    F. SCHIEBER ET AL    2,134,766
PHOTOGRAPHIC SHUTTER
Filed May 9, 1938    2 Sheets-Sheet 1
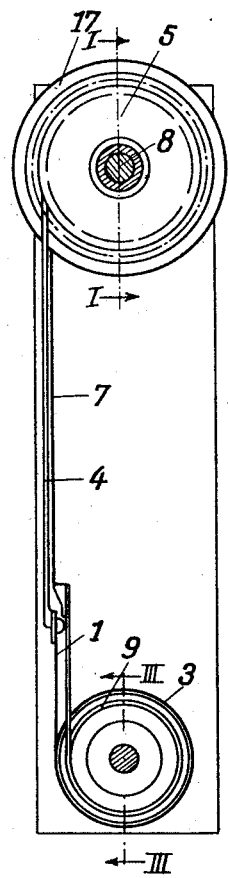
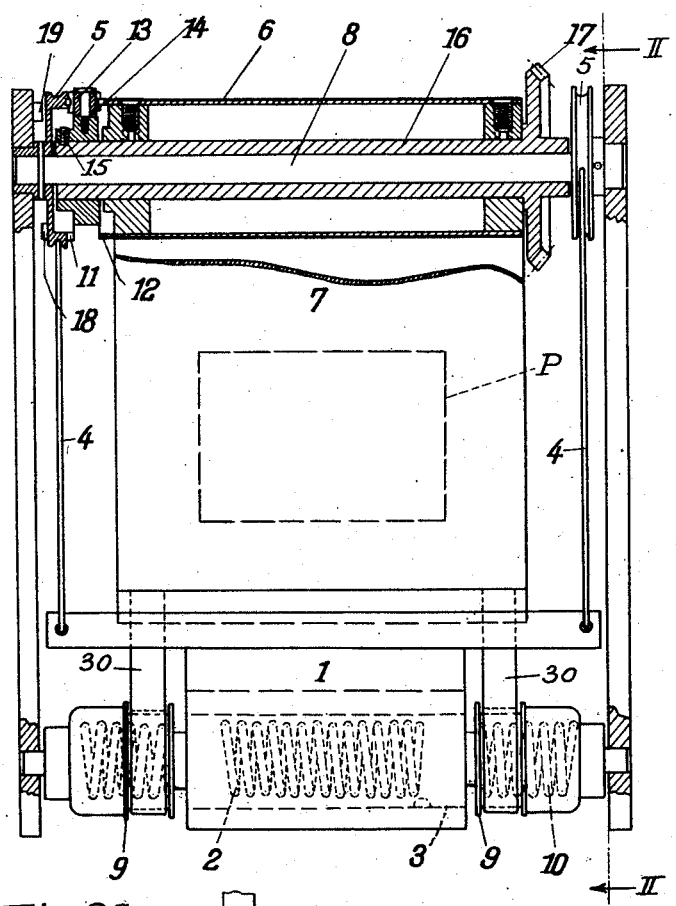
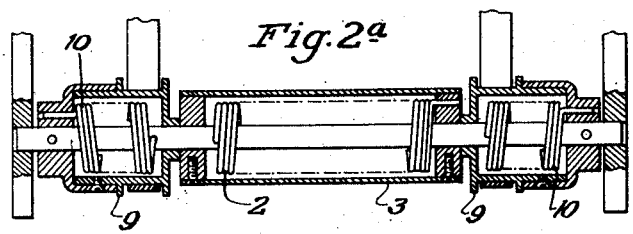
Inventors:
Friedrich Schieber, Albert Wolf
by B. Singer and F. Stein
Attorneys

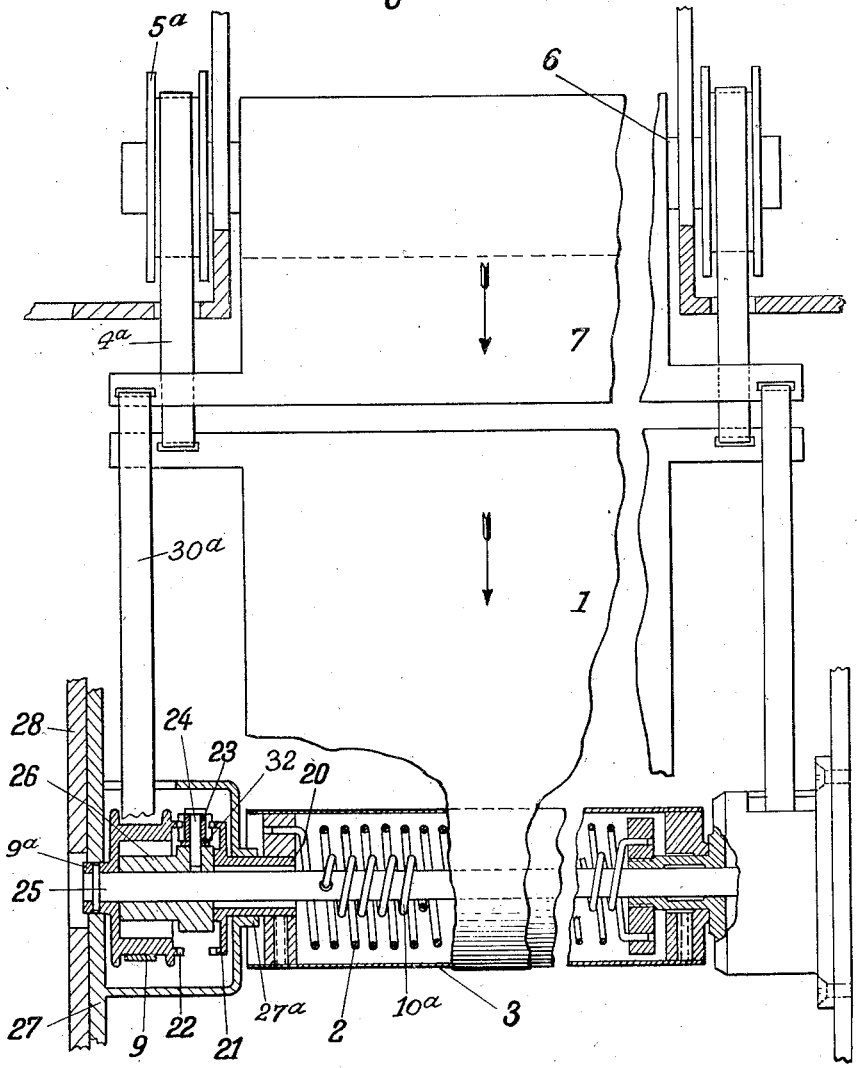

Patented Nov. 1, 1938

2,134,766

UNITED STATES PATENT OFFICE 2,134,766

PHOTOGRAPHIC SHUTTER

Friedrich Schieber, Dresden, and Albert Wolf, Dresden-Laubegast, Germany, assignors to Zeiss Ikon Aktiengesellschaft, Dresden, Germany Application May 9, 1938, Serial No. 206,746
In Germany June 10, 1937

13 Claims. (Cl. 95—57)

The invention relates to photographic shutters and in particular is directed to improvements in photographic curtain shutters.

Curtain shutters for photographic cameras, also called focal plane shutters, because they are arranged directly in front of the light sensitive layer to be exposed, are usually equipped with two curtain sections, between which a narrow slot is formed through which the light passes to the light sensitive layer during the exposure movement of the shutter. It is known to connect the two curtain sections with each other and also with the mechanism for adjusting the width of the slot by a differential gearing. This differential gearing is usually provided with a gear rotating only when the width of the slot is to be adjusted, but remains stationary during the normal operation of the shutter. In a curtain shutter of this type the width of the slot can only be varied by a manual adjustment, and it is impossible to obtain an automatic opening and closing of the slot during the exposure movement.

It is an object of the present invention to provide a curtain shutter with a novel differential gearing between the two curtain sections and between the latter and the shutter adjusting mechanism, and in which the shutter adjusting mechanism is also employed for tensioning or winding of the shutter when the curtain sections are in overlapping relation, i. e. in closed position. The novel differential gearing is designed to effect successively during the release of the shutter an opening and closing of the curtain slot.

It is also an object of the invention to provide a curtain shutter with a differential gearing which not only constitutes the drive of the shutter but also a very simple and dependable coupling between the two curtain sections.

Another object of the invention is a curtain shutter provided with a drive and coupling means for the two curtain sections which occupies only a very small space, so that the curtain shutter is especially adapted for photographic cameras of the miniature type.

Other objects of our invention will be apparent from the description with reference to the accompnaying drawings forming a part of this specification, but we do not limit ourselves to the embodiments of the invention herein described and illustrated, as various forms may be adopted within the scope of the claims:

In the drawings:

Fig. 1 is an elevation view of the curtain shutter, partly in section along the line I—I of Fig. 2.

Fig. 2 is an end view of the curtain shutter, substantially along the line II—II of Fig. 1.

Fig. 2a is a section along the line III—III of Fig. 2, and

Fig. 3 illustrates in elevation view and partly in section a curtain shutter of a somewhat modified construction.

Referring to the Figs. 1 and 2, 1 designates the leading curtain section which under the action of a spring 2 is wound upon the hollow drum 3 when the previously tensioned shutter is released. During the tensioning of the shutter the tapes or cords 4 are wound upon sheaves 5, thereby drawing the curtain section 1 upwardly, past the picture area of the camera indicated in dotted lines at P in Fig. 1.

The sheaves 5 are fixedly attached adjacent the ends of a shaft 8, whose axis of rotation coincides with that of the drum 6 upon which the other or following curtain section 7 is wound.

The shaft 8 extends freely rotatable through a tubular shaft 16, which in turn rotatably supports the drum 6.

Adjacent both ends of the drum 3, upon which the leading curtain section 1 is attached and wound during the exposure movement of the shutter, is arranged in axial alinement with the said drum 6 a roller 9. These rollers 9 are rotatable independently of the drum 6 and are subjected to the tension of a spring 10 and have attached thereto a tape 30 connected with the following curtain section 7.

One of the sheaves 5 is provided on the end face directed toward the drum 6 with gear teeth 11 forming in effect a crown wheel. The end face of the drum 6 facing said last mentioned sheave 5 is likewise provided with gear teeth 12 forming another crown wheel. Between said two crown wheels and meshing with the same is mounted a pinion 13, which is rotatable about an axis extending at a right angle with respect to the common axis of rotation of said sheave 5 and drum 6. The pinion 13 forms in effect a planetary gear which is rotatably mounted on a carrier 14 fixedly secured by a set-screw 15 or the like, to the adjacent end of the tubular shaft 16. The other end of the tubular shaft 16 has attached thereto a bevel gear 17 which, in a manner not illustrated in the drawings, is connected with the shutter winding and adjusting mechanism.

The sheave 5, provided on one of its faces with the gear teeth 11, has on its other face a projection 18 which in the upper end position of the leading curtain section 1, i. e. when the shutter is tensioned, engages a stop 19 on the shutter casing.

The operation of the curtain shutter is as follows:

For tensioning or winding the curtain shutter the bevel gear 17 is rotated clockwise, thereby rotating the tubular shaft 16 and the carrier 14 of the planetary gear 13 in the same direction. Since the springs 2 and 10 oppose this winding action and act with the same force upon the lower and upper curtain section 1 and 7 respectively, the moments of torsion acting upon the planetary gear 13 compensate each other and both curtain sections 1 and 7, which are in superposition, are moved upwardly. When the projection 18 of the one sheave 5 engages the stationary stop 19 the rotation of the sheaves 5 is stopped and the leading curtain section 1 remains stationary during the further winding of the shutter. The planetary gear 13 which until this time did not rotate between the two crown gears starts now to roll along the stationary gear teeth 11 and drives the drum 6 with a greater speed than heretofore, until the curtain section 7 has reached its upper end position. During this final period of the winding operation the curtain sections 1 and 7 are moved relatively to each other until a slot between the same is formed of a width according to the selected adjustment.

Upon release of the shutter the curtain section 1 is pulled downwardly and is wound upon the drum 3 due to the action of the spring 2. Simultaneously therewith the tapes 30 of the curtain section 7 are wound upon the rollers 9 due to the action of the spring 10. Owing to the same or approximately the same tension of the springs 2 and 10 the slot between the curtain sections 1 and 7 remains unaltered. This is so, because the planetary gear 13 which is connected with the shutter winding mechanism does not rotate about its own axis, but is bodily moved by its carrier 14 about the axis of the shaft 8. Therefore, neither the drum 6 nor the sheaves 5 can rotate relatively to each other, but have to rotate in unison.

However, as soon as the leading curtain section 1 reaches its lower end position,—the exposure of the light sensitive layer through the slot having been accomplished—the planetary gear 13 starts to rotate about its own axis, but in reverse direction as during the winding operation and effects a rotation of the tubular shaft 16 relative to the drum 6. When the following curtain section 7 has reached the position illustrated in the drawings the slot has been closed and the planetary gear 13 and therewith the tubular shaft 16 stops.

The employment of the planetary gearing 11, 13, 12 between the sheave 5 of the leading curtain section 1 and the drum 6 of the following curtain section 7 results in a very compact construction and in a dependable operation of the shutter.

Fig. 3 illustrates a modified construction of the curtain shutter, in which the drum 3 of the leading curtain section 1 is fixedly connected with the hub 20 of a crown wheel 21. One of the rollers 9, which by the tapes 30ᵃ are connected with the following curtain 7, is provided on that side facing the drum 3 with gear teeth 22 forming in effect another crown wheel. A planetary gear 23 meshes with both crown wheels and it is rotatably mounted on a bolt 24 which is radially secured to a sleeve 26 which is rotatably mounted on a shaft 25 to which the rollers 9 are secured. The hub 9ᵃ of the roller 9 is rotatably mounted in a bearing casing 27 attached to the shutter casing 28. The bearing casing 27 surrounds the roller 9 and the planetary gearing 22, 23, 21 and also supports rotatably at 27ᵃ the hub 20 of the crown wheel 21, which as mentioned before is fixedly attached to the drum 3. The latter is rotatable about the shaft 25.

In the tensioned or wound condition of this modified curtain shutter the upper curtain section 7 and the tapes 4ᵃ of the lower curtain section 1 are wound upon the drum 6 and the rollers 9ᵃ respectively. Both curtain sections overlap each other, so that there is no slot between the same. The lower curtain section 1 is locked in its upper end position and upon release of the locking means is wound upon the hollow drum 3 due to the action of the spring 2. The upper curtain section 7 remains for a while in its upper position until the slot between the curtain section has been formed. During the initial downward movement of the lower curtain section 1 the planetary gear 27 rolls along the gear teeth 22 of the roller 9 in the direction of rotation of the drum 3, but with a smaller speed than the latter.

The size of the width of the slot between the two curtain sections 1 and 7 is determined by the point of time the upper curtain section 7 is released. When the upper curtain section 7 is released by the shutter mechanism, it is moved by the spring 10ᵃ in the same direction as the leading curtain section 1.

During the simultaneous movement of the curtain sections 1 and 7, the planetary gear 23 between the crown wheels does not rotate about its own axis, but acts as a rigid coupling means between the crown wheels and rotates together with the same about the axis of the shaft 25.

When the leading curtain section 1 has reached its lower end position it stops, while the following curtain section 7 continues its movement and gradually closes the slot between the curtain sections. During the time period at which the following curtain section 7 moves alone, the planetary gear 23 rolls in the same direction of rotation along the crown wheel 21, but with smaller speed than the roller 9.

When the curtain shutter, after having made an exposure, is again tensioned, both crown wheels 21 and 22 will rotate with the same seed and the planetary gear 23 does not rotate about its own axis, but is moved together with the sleeve 26 about the axis of the shaft 25. The curtain sections 1 and 7 remain securely closed during the winding of the shutter, because the differential gearing prevents a relative movement of the two curtain sections, even if the tensions of the two springs 2 and 10ᵃ should vary somewhat.

In order to prevent with certainty any variation of the adjusted width of the slot, the planetary gear is mounted on its carrier in such a manner that its bearing friction is greater than any stresses which may tend to change the size of the slot. Fig. 3 discloses by way of example, that a washer 32 may be inserted between the sleeve 26 and the planetary gear 23 to increase the bearing friction at this place.

We claim as our invention:

1. In a curtain shutter for photographic cameras, a curtain comprising two sections, two parallel spaced rotatable drums, each having attached thereto one of said curtain sections, the free ends of said curtain sections being adapted to form between the same an exposure slot, means for winding one curtain section and unwinding the other curtain section from their respective drums, said means including a differential gearing composed of a planetary gear and two gears meshing with said planetary gear, one of said two gears being coaxially connected with one of said drums and the other gear being operatively connected with the other drum, spring means opposing the said winding and unwinding of said curtain sections from their respective drums, said spring means rotating said drums in a direction opposite to that of said winding means during the exposure movement of the shutter, said planetary gear normally forming a rigid coupling member between said two gears and after movement of one curtain section into one of its end positions commences to roll along that gear which is connected with said last named curtain section to effect a continuous rotation of the other gear for moving the other curtain section relatively to the first one which has reached its end position, thereby closing the exposure slot.

2. In a curtain shutter for photographic cameras, a curtain comprising two sections, two parallel spaced rotatable drums, each having attached thereto one of said curtain sections, the free ends of said curtain sections being adapted to form between the same an exposure slot, means for winding one curtain section and unwinding the other curtain section from their respective drums, said means including a differential gearing composed of a planetary gear and two gears meshing with said planetary gear, one of said two gears being coaxially connected with one of said drums and the other gear being operatively connected with the other drum, spring means opposing the said winding and unwinding of said curtain sections from their respective drums, said spring means rotating said drums in a direction opposite to that of said winding means during the exposure movement of the shutter, said planetary gear after movement of one curtain section into one of its end positions commences to roll along that gear which is connected with said last named curtain section to effect a continuous rotation of the other gear for moving the other curtain section relatively to the first one which has reached its end position, thereby closing the exposure slot, said planetary gear during the operation of said winding means forming a rigid coupling member between said two gears for moving said two curtain sections with the exposure slot closed into tensioned position.

3. In a curtain shutter for photographic cameras, a curtain comprising two sections, two parallel spaced rotatable drums, each having attached thereto one of said curtain sections, the free ends of which are adapted to form between the same an exposure slot, means for winding and adjusting the shutter, a differential gearing connecting said drums with each other and with said winding and adjusting means, said defferential gearing including a planetary gear meshing with two gears, one of said two gears being coaxially connected with one of said drums and the other gear being operatively connected with the other drum, and spring means for rotating said drums in a direction opposite to that of said winding and adjusting means, said planetary gear effecting a relative movement between said curtain sections near the end of the shutter exposure movement for closing the slot between said curtain sections.

4. In a curtain shutter for photographic cameras, a curtain comprising two sections, two parallel spaced rotatable drums, each having attached thereto one of said curtain sections, the free ends of which are adapted to form between the same an exposure slot, means for winding and adjusting the shutter, a differential gearing connecting said drums with each other and with said winding and adjusting means, said differential gearing including a planetary gear meshing with two gears, one of said two gears being coaxially connected with one of said drum and the other gear being operatively connected with the other drum, and spring means for rotating said drums in a direction opposite to that of said winding and adjusting means, said planetary gear effecting a relative movement between said curtain sections near the end of the shutter exposure movement for closing the slot between said curtain sections, and forming a rigid connection between said two gears during the initial operation of said winding and adjusting means for returning said curtain sections with the exposure slot closed into operative tensioned position.

5. In a curtain shutter for photographic cameras, a curtain comprising two sections, two parallel spaced rotatable drums, each having attached thereto one of said curtain sections, the free ends of which are adapted to form between the same an exposure slot, a roller rotatably mounted adjacent each end of said drums in axial alinement therewith, flexible members connecting said rollers with the free end of the curtain section attached to the opposed drum, means for winding and adjusting the shutter, spring means for rotating said drums upon release of the shutter, and a differential gearing for connecting said drums with each other and with said winding and adjusting means, said differential gearing including a planetary gear meshing with two gears, one of said two gears being attached to one end of one of said drums and the other gear being coaxially connected with the roller mounted adjacent said last mentioned drum, and means for rotating said planetary gear about the common axis of said last mentioned drum and roller, said last named means being operatively connected with said winding and adjusting means.

6. In a curtain shutter for photographic cameras, a curtain comprising a leading section and a following section forming between the same an adjustable exposure slot, two parallel spaced rotatable drums, one having one end of said leading curtain section attached thereto and the other drum having said following curtain section attached thereto, a roller rotatably mounted adjacent each end of said drums in axial alinement therewith, flexible members connecting the rollers with the free end of the curtain section attached to the opposed drum, spring means for rotating said drums upon release of the shutter, means for winding and adjusting the shutter, a differential gearing for connecting said drums with each other and with said winding and adjusting means, said differential gearing including a planetary gear meshing with two gears, one of said two gears being attached to the drum of the following curtain section and the other gear being coaxially connected with one of the rollers mounted adjacent the ends of said last mentioned drum, and means for rotating said planetary gear about the axis of the drum having the following curtain section attached thereto, said last named means being operatively connected with said winding and adjusting means.

7. In a curtain shutter for photographic cameras, a curtain comprising two sections, two parallel spaced rotatable drums, each having attached thereto one of said curtain sections, the free ends of said curtain sections being adapted to form between the same an exposure slot, a roller rotatably mounted adjacent each end of said drums in axial alinement therewith, flexible members connecting said rollers with the free end of the curtain section attached to the opposed drums, means for winding and adjusting the shutter, spring means for rotating said drums upon release of the shutter, a differential gearing for connecting said drums with each other and with said winding and adjusting means, said differential gearing including a planetary gear meshing with two gears, one being attached on one end of one of said drums and the other gear being rotatable with the roller mounted adjacent and in axial alinement with said last mentioned drum, and a shaft extending axially and rotatably through said last mentioned drum and operatively connected with said winding and adjusting means, said shaft having a member attached thereto on which said planetary gear is rotatably supported.

8. In a curtain shutter for photographic cameras, a curtain comprising a leading section and a following section forming between the same an adjustable exposure slot, two parallel spaced rotatable drums, one having one end of said leading curtain section attached thereto and the other drum having said following curtain section attached thereto, a roller rotatably mounted adjacent each end of said drums in axial alinement therewith, flexible members connecting the rollers with the free end of the curtain section attached to the opposed drum, spring means for rotating said drums upon release of the shutter, means for winding and adjusting the shutter, a differential gearing for connecting said drums with each other and with said winding and adjusting means, said differential gearing including a planetary gear meshing with two gears, one of said two gears being attached to the drum of the following curtain section and the other gear being rotatabe and coaxial with one of the rollers mounted adjacent the ends of said last mentioned drum, and a shaft extending axially and rotatably through the drum having the following curtain section attached thereto, said shaft being operatively connected with said winding and adjusting means and having attached thereto a member on which said planetary gear is rotatably supported about an axis at a right angle with respect to the axis of said shaft.

9. In a curtain shutter for photographic cameras, a curtain comprising a leading section and a following section forming between the same an adjustable exposure slot, two parallel spaced rotatable drums, one having one end of said leading curtain section attached thereto and the other drum having said following curtain section attached thereto, a roller rotataby mounted adjacent each end of said drums in axial alinement therewith, a shaft extending axially through each drum for rigidly connecting the rollers with each other, flexible members connecting the rollers with the free end of the curtain section attached to the opposed drum, spring means for rotating said drums upon release of the shutter, means for winding and adjusting the shutter, a differential gearing for connecting said drums with each other and with said winding and adjusting means, said differential gearing including a planetary gear meshing with two gears, one being attached to the drum of the following curtain section and the other gear being coaxially connected with one of the rollers mounted adjacent the ends of said last mentioned drum, and means for rotating said planetary gear about the axis of the drum having the following curtain section attached thereto, said last named means being operatively connected with said winding and adjusting means.

10. A curtain shutter as claimed in claim 9, including a stationary stop, and a projection on one of the rollers which are connected by said flexible members with said leading curtain section, said projection engaging said stop when the leading curtain section upon winding the shutter reaches its end position, whereupon said differential gearing becomes effective during the continued winding operation to adjust the exposure slot to the desired width by moving the following curtain section relatively to the leading curtain section.

11. In a curtain shutter for photographic cameras, a curtain comprising a leading section and a following section forming between the same an adjustable exposure slot, two parallel spaced rotatable drums, one having one end of said leading curtain section attached thereto and the other drum having said following curtain section attached thereto, a roller rotatably mounted adjacent each end of said drums in axial alinement therewith, flexible members connecting the rollers with the free end of the curtain section attached to the opposed drum, means for winding and adjusting the shutter, spring means for rotating said drums upon release of the shutter, a differential gearing for connecting said drums with each other and with said winding and adjusting means, said differential gearing including a planetary gear meshing with two gears, one of said two gears being fixed to one end of the drum having the leading curtain section attached thereto and the other gear being formed of gear teeth arranged on the side of the roller mounted coaxial with said last named drum, said planetary gear being rotatably mounted on a gear carrier which is freely rotatable about the axis of said last named drum.

12. In a curtain shutter for photographic cameras, a curtain comprising a leading section and a following section forming between the same an adjustable exposure slot, two parallel spaced rotatable drums, one having one end of said leading curtain section attached thereto and the other drum having said following curtain section attached thereto, a roller rotatably mounted adjacent each end of said drums in axial alinement therewith, a shaft extending axially through each drum for rigidly connecting the rollers with each other, means for winding and adjusting the shutter, spring means for rotating said drums upon release of the shutter, a differential gearing for connecting said drums with each other and with said winding and adjusting means, said differential gearing including a planetary gear meshing with two gears, one being fixed to one end of the drum having the leading curtain section attached thereto and the other gear being formed of gear teeth arranged on the side of the roller mounted coaxial with said last named drum, said planetary gear being rotatably mounted on a gear carrier which is positioned between said two gears and is rotatably supported by the shaft which connects the two rollers adjacent the ends of the last named drum with each other.

13. A curtain shutter as claimed in claim 12, including a casing surrounding said differential gearing, and a bearing formed by said casing for rotatably supporting the drum on which said leading curtain section is attached.

FRIEDRICH SCHIEBER.
ALBERT WOLF.